(12) United States Patent
Craft

(10) Patent No.: US 11,288,647 B2
(45) Date of Patent: *Mar. 29, 2022

(54) RADIO DEVICE BASED TRANSACTIONS AT A POINT OF SALE TERMINAL

(71) Applicant: Engineered IP LLC, Washington, DC (US)

(72) Inventor: Michael Craft, Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/773,614

(22) Filed: Jan. 27, 2020

(65) Prior Publication Data

US 2020/0302416 A1    Sep. 24, 2020

Related U.S. Application Data

(63) Continuation of application No. 15/706,361, filed on Sep. 15, 2017, now Pat. No. 10,546,285, which is a continuation of application No. 14/249,761, filed on Apr. 10, 2014, now Pat. No. 9,792,596, which is a
(Continued)

(51) Int. Cl.
| | |
|---|---|
| *G06Q 20/20* | (2012.01) |
| *G06Q 20/04* | (2012.01) |
| *G06Q 20/32* | (2012.01) |
| *G06Q 30/02* | (2012.01) |

(52) U.S. Cl.
CPC ........ *G06Q 20/202* (2013.01); *G06Q 20/045* (2013.01); *G06Q 20/208* (2013.01); *G06Q 20/3274* (2013.01); *G06Q 30/02* (2013.01); *G06Q 30/0222* (2013.01); *G06Q 30/0225* (2013.01); *G06Q 30/0226* (2013.01); *G06Q 30/0234* (2013.01); *G06Q 30/0238* (2013.01); *G06Q 30/0239* (2013.01)

(58) Field of Classification Search
USPC ...................................... 705/14.38, 14.3, 16
See application file for complete search history.

(56) References Cited

U.S. PATENT DOCUMENTS

| | | | |
|---|---|---|---|
| 5,855,007 | A | 12/1998 | Jovicic |
| 7,096,205 | B2 | 8/2006 | Hansen |
| 7,487,262 | B2 | 2/2009 | Cardina |

(Continued)

FOREIGN PATENT DOCUMENTS

| | | | | |
|---|---|---|---|---|
| CA | 2 354 230 A1 | 2/2002 | ............ | G06Q 30/02 |
| CA | 2 510 577 A1 | 7/2004 | ........... | G06Q 20/342 |

(Continued)

OTHER PUBLICATIONS

U.S. Appl. No. 15/706,361 prosecution history.
(Continued)

*Primary Examiner* — William E Rankins

(57) ABSTRACT

Virtual mobile rewards, gift cards, and/or physical world retailers' loyalty and reward programs are aggregated into a common account accessible and transactional from a radio device. Subscribers gain access to discounted codes, coupons, rebates, gift cards, and/or limited time offers, on their radio device for food, travel, lifestyle, electronics, and entertainment products that fit their lifestyle spending habits, enabling users to edit participating retailers, manage separate account balances, and present preferred discounted offers at retailers and apply discount towards purchase of goods.

10 Claims, 4 Drawing Sheets

Related U.S. Application Data continuation of application No. 12/003,927, filed on Jan. 3, 2008, now Pat. No. 8,700,457.

(60) Provisional application No. 60/878,094, filed on Jan. 3, 2007.

(56) References Cited

U.S. PATENT DOCUMENTS

| | | | |
|---|---|---|---|
| 7,609,650 B2 | 10/2009 | Roskowski | |
| 7,870,021 B2 | 1/2011 | Mankoff | |
| 8,155,677 B2 | 4/2012 | Hewes | |
| 8,611,867 B2 | 12/2013 | Swanburg | |
| 8,762,263 B2 * | 6/2014 | Gauthier | G06Q 20/385 705/39 |
| 2002/0088855 A1 | 7/2002 | Hodes | |
| 2002/0091569 A1 | 7/2002 | Kitaura | |
| 2002/0091571 A1 | 7/2002 | Thomas | |
| 2003/0061170 A1 | 3/2003 | Uzo | |
| 2003/0233276 A1 | 12/2003 | Pearlman | |
| 2004/0158492 A1 | 8/2004 | Lopez | |
| 2004/0186770 A1 | 9/2004 | Pettit | |
| 2005/0010533 A1 | 1/2005 | Cooper | |
| 2005/0131761 A1 | 6/2005 | Trika | |
| 2005/0251456 A1 | 11/2005 | Perkowski | |
| 2006/0015404 A1 | 1/2006 | Tran | |
| 2006/0018450 A1 | 1/2006 | Sandberg-Diment | |
| 2006/0270478 A1 | 11/2006 | Barhydt | |
| 2007/0000997 A1 | 1/2007 | Lambert | |
| 2007/0103993 A1 | 5/2007 | Mount | |
| 2007/0124211 A1 | 5/2007 | Smith | |
| 2007/0138270 A1 | 6/2007 | Reblin | |
| 2008/0059285 A1 | 3/2008 | Hamoui | |
| 2008/0059300 A1 | 3/2008 | Hamoui | |
| 2009/0138302 A1 | 5/2009 | Breznik | |
| 2009/0281849 A1 | 11/2009 | Choi | |

FOREIGN PATENT DOCUMENTS

| | | | | |
|---|---|---|---|---|
| GB | 2 362 012 A | | 11/2001 | G06Q 20/04 |
| JP | WO 0188792 A1 | | 11/2001 | G06Q 30/06 |
| KR | 20080044123 A | * | 5/2008 | G06Q 30/02 |
| KR | 20080044123 A | | 5/2008 | G06Q 30/02 |
| WO | WO 2004072915 A2 | | 8/2004 | G06Q 20/04 |

OTHER PUBLICATIONS

Henryk Plotz, Martin Stigge, Wolf Muller, and Jens-Peter Redlich; Humbolt University Berlin Computer Science Department Systems Architecture Group; "Self-Replication in J2ME Midlets"; HU Berlin Public Report SAR-PR-2006-04; Mar. 2006; pp. 1-13.

Krejlgaard, Chris; "Card Store Diversities Product Line to Keep Up with Changes in the Market", Northern Ontario Business; Feb. 1992; pp. 1-3.

Gavin Clarke in Las Vegas; The A Register; "Qualcomm Beckons Developers with BREW Forgotten, not gone", Apr. 6, 2006; pp. 1-1.

Andre N. Klingsheim, J2ME Bluetooth Programming, Department of Informatics University Bergen; Jun. 30, 2004; pp. 1-183.

* cited by examiner

RADIO DEVICE BASED TRANSACTIONS AT A POINT OF SALE TERMINAL

This application is a continuation of U.S. patent application Ser. No. 15/706,361, entitled "Mobile Phone Based Transactions At A Point Of Sale Terminal," filed on Sep. 15, 2017, now U.S. Pat. No. 10,546,285; which claims priority from U.S. patent application Ser. No. 14/249,761, entitled "Mobile Phone Based Rebate Device For Redemption At A Point Of Sale Terminal,", filed on Apr. 10, 2014, now U.S. Pat. No. 9,792,596; which claims priority from U.S. patent application Ser. No. 12/003,927, entitled "Mobile Phone Based Rebate and Gift Card Aggregation", filed on Jan. 8, 2008, now U.S. Pat. No. 8,700,457; which claims priority to U.S. Provisional Application No. 60/878,094, filed Jan. 3, 2007, entitled "Mobile Phone Based Rebate and Gift Card Aggregation," all of which are incorporated herein by reference.

BACKGROUND OF THE INVENTION

1. Field of the Invention

This invention relates generally to rebate reward and/or gift card technologies. More particularly, it relates to user application based services for rebate and gift card technologies.

2. Background of the Related Art

As more retailers add loyalty and reward programs to their Customer Relationship Management (CRM) efforts, capturing the required additional customer data requires lengthy and intrusive questions often leading the consumer to give false information, fearful the information will be sold to third parties. As mobile device saturation reaches peak numbers in the coming years, retailers know an increasing percentage of their customers carry mobile devices, but lack a way to incorporate these devices to build a trusting relationship.

Traditional programs offer discounted offers or coupons from a single source. This system and process lacks scalability, and provides no way to ingest mobile transactions into a master rewards program, track mobile transactions back to a mobile customer, and show valued customers specialized treatment and added value.

Ultimately, mobile customers need a single trusted service to manage multiple reward programs, and retailers need a marketing channel trusted by their mobile device customers and visibility to who is redeeming their loyalty points on a regular basis.

SUMMARY OF THE INVENTION

In accordance with the principles of the present invention, a method implements a mobile radio based rebate processing reward system. The method receives a rebate transaction identifier assigned to the radio device, the rebate transaction identifier being assigned to the rebate request by the POS rebate processing system. The rebate transaction identifier is output to the remote rebate processing center. Status information for the rebate request is retrieved from the rebate processing center. Status information is synchronized with a remote application server for display on a mobile radio device.

An interactive radio device-based interface for facilitating rebate processing in accordance with another aspect of the invention includes an interface operable to display a plurality of rebates for interaction by a user to redeem for a product at a physical point of sale terminal. Promotion information is received from a centralized processing network, the promotion information comprising a product identifier and a plurality of rebate options for receiving an authorized rebate, at least one of the rebate options having a cash value different than another one of the alternative rebates. Promotion information is communicated to a commercial radio device. A status of the promotion based on purchases of the product is received, the status indicating a number of rebate requests for the promotion and a number of authorized rebates fulfilled for each of the rebate options for the promotion.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
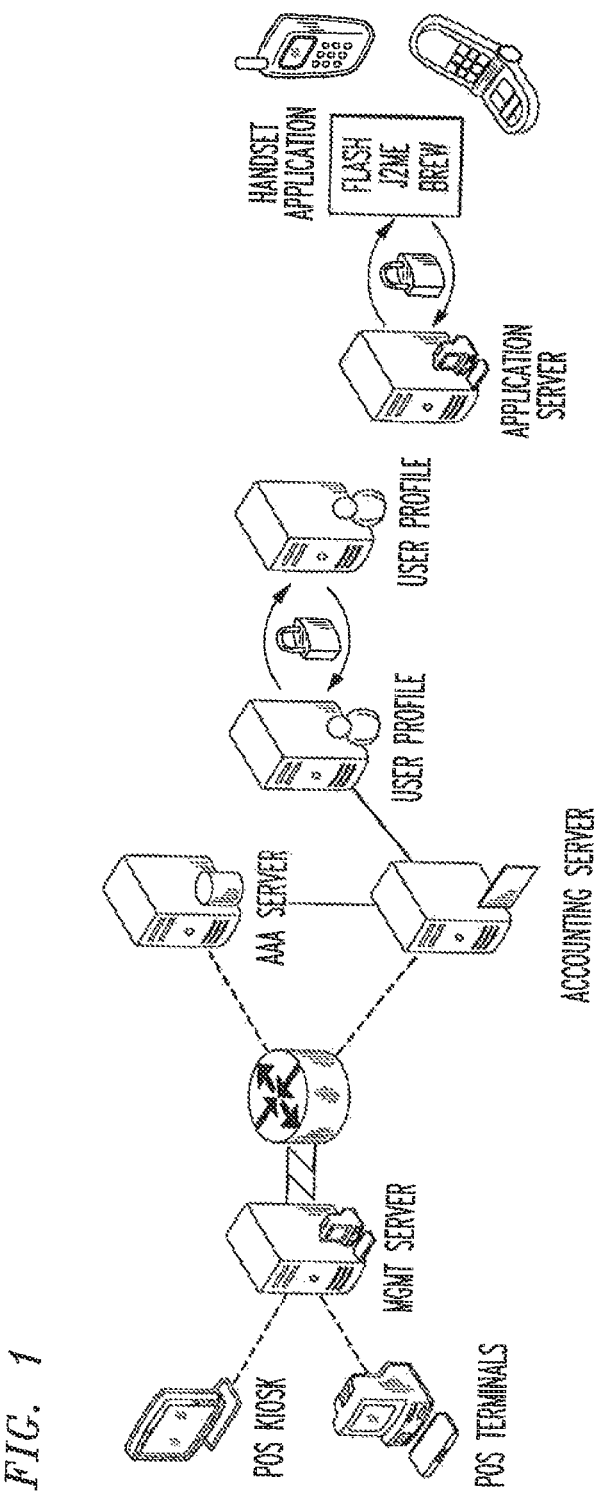
FIG. 1 shows an overview of Stored Account Value Rewards (SAVR) service architecture and platforms according to an embodiment of the invention.

The invention relates to systems and methods for implementing a virtual mobile rewards program designed to aggregate physical world retailers' loyalty and reward programs into a single account accessible and transactional from an Internet capable mobile radio device.

Stored Value Rewards (SVR) is a program that use Mobile Directory Number (MDN)/Mobile Identification Number (MIN)/Mobile Station International Subscriber Directory Number (MSISDN) to register a virtual mobile rewards account to provide user with $XX in coupons, offers, and limited time deals on food, lifestyle, electronics, and entertainment direct from retailers. The program aggregates 1000+ loyalty programs into a single account accessible and transactionable from the mobile device. Coupon codes, PINs, SKUs, and barcodes are aggregated from multiple programs, recognized by participating Point of Sale (POS) terminals, stored on a secure server, and accessible from a single BREW/FLASH/J2ME application. Accounting checks & balances are managed per transaction by an accounting server, which then exchanges data with the application server, to which the application synchronizes.

In an embodiment: the Point of Sale (POS) terminal exchanges data and updates a centralized Accounting Server. The accounting Server updates an Application Server storing the Virtual Account. The Virtual Account is accessible and viewable by the Mobile Application on the device.

Introduction to the Stored Account Value Rewards (SAVR) Program

Point of Sale Systems (POS)—POS terminals accept rebates, product identification numbers (PINs), Stock Keeping Units (SKUs), and Barcodes (Discount Codes) in a plurality of different ways, but all forms of discounts and application against a transaction resolve to a numerical ID or code that requires authentication. This invention uses the single point of convergence by integrating with the POS backend processing software; thus allowing a single view to the single process in place of updating Point of Sale (POS) processing systems when new PINs, SKUs, and discount codes are added. Using this process, participating POS terminals will be prepared to recognize and process new product identification numbers (PINs) and codes that will be recognized as Mobile Transactions and routed to appropriate accounting systems processing, authentication, authorization and accounting (AAA), and reporting environments.

Point of Sale (POS) systems and authentication, authorization and accounting (AAA) servers are prepared to receive new Discount Codes for this mobile program by updating the scripts containing the algorithm for reversing discount codes to recognize the mobile identifier, and route to the appropriate authentication, authorization, and accounting (AAA) server. Point of Sale (POS) terminals will perform standard discount code look-up authentication as it would for any discount or gift card. When the discount code is authenticated, the POS terminal determines the transaction to be a mobile transaction. The transaction is processed in its own usual fashion and per the retailers Terms and Conditions, but additionally all transactional data is copied to the centralized Accounting Server.

Mobile Directory Number (MDN) is used as a cash register locator for tax purposes.

Accounting Server—The Accounting Server is a secure centralized server that processes and stores the transactional data for each virtual account ID. This server is networked to all participating Point of Sale (POS) terminal processing systems, the authentication, authorization, and accounting (AAA) server, and the Application Server to which the data is synchronized and exported. The Accounting Server hosts, posts, aggregates, and manages the participating loyalty program rules, currencies, and transactional data. For each transaction at a retail Point of Sale (POS) terminal, the Accounting Server processes the transactions against the appropriate loyalty account by crediting or debiting the stored value/balance. The Accounting Server makes account metadata available for additional servers and systems to extract information real-time. This server has the following functionalities:

For new accounts, when the Accounting Server receives registration data, the Accounting Server creates a session and aggregates all participating retailers and starting balances, creates discount codes specific to the account, then stores them under a Virtual Account ID. Virtual Account IDs are unique identification numbers that will follow users across any mobile phone or device. Each participating retailer within the account is assigned a sub-account ID, which is tied to the Virtual Account ID. Using a series of algorithms, the discount codes resolve back to the Retailer ID, so transactions can be resolved back to the Virtual Account ID. The Accounting Server stores new accounts in a live environment available for POS terminal processing systems, reporting systems, and APIs for add-on management applications. All IDs are invisible to the user.

The Accounting Server activates a new account by applying Mobile Directory Number (MDN), Mobile Identification Number (MIN), and other data passed by the Application Server against an algorithm to create a unique ID for the account called the Virtual Account ID.

The algorithm is applied against the Mobile Identification Number (MIN)/Mobile Directory Number (MDN)/International Mobile Subscriber Identity (IMSI)/Mobile Station International Subscriber Directory Number (MSISDN) to create the Virtual Account ID.

The algorithm is applied against the Virtual Account ID to create a Retail Account IDs for each participating retailer's offers within a Virtual Account.

Any sub account or loyalty program added later is created against the unique ID.

The algorithm is applied against each Retailer ID to create Discount Codes stored in an account.

The Algorithm is added to an authentication, authorization, and accounting (AAA) script for reversing and authenticating discount codes for the Point of Sale (POS) terminal.

The accounting server uses a discount code to determine the Virtual Account ID, enabling all transactional data to be routed to the appropriate Virtual account copied to all reporting systems accordingly.

Discount Codes (PINs/SKUs/Barcodes)

Discount codes presented at the retail Point of Sale (POS) terminal must be traceable back to the user's Virtual Account for transaction processing, reporting, gifting, rewards, and additional features. Discount codes stay with each retailer sub account allowing the value to be debited like a gift card, and credited for rewards. To achieve this, discount codes are created and assigned when the Accounting Server receives initial registration data. Information sent by a mobile device is used against an algorithm to create discount codes under each retailer ID. As mentioned above, the reverse algorithm is used against discount codes to determine the Virtual Account ID during a transaction; thus linking the account to the retail transaction, and enabling more data to be captured and with minimal interaction from the customer and cashier.

Application Server—The Application Server hosts the environment for the Virtual Account accessed by the application. Although the Accounting Server synchronizes transactional data with the Application server, this environment is kept securely separate for security reasons.

The Application Server is designed to synchronize with multiple external environments to provide a comprehensive Virtual Account that manages different loyalty programs into a single account accessible and transactionable from the mobile device. At this application layer, the virtual account can exchange credit and debit updates with the Accounting Server in real-time, synchronize data with many additional POS terminal aggregators, synchronize profile updates and deltas with device application, and export more robust reporting data than loyalty and reward programs in place today.

Handset Application—The downloadable handset application serves as the viewer and dashboard to the virtual consolidation of retail reward programs. Once the user downloads and registers, the user accesses and syncs with their Virtual Account residing on the Application Server. Registered users have real-time access to participating retailers' discounted offers, and present the offers on their mobile device at retailers' Point of Sale (POS) terminals. The application manages and displays the correct balance, credits, debits, and point conversions associated with the retailer's loyalty, affinity, and frequent customer reward program.

The network aware application can be in any runtime supporting interactive menu system and a secure network connection including, but not limited to Flash, J2ME, and BREW. The application synchronizes over a wireless data network, authenticating the user, and synchronizes the Application Server to update the account profile on the mobile device.

Registering a Virtual Profile

Users must register within the application to activate a virtual account and profile. Users set up accounts similar to a new Mobile Outlook Express Post Office Protocol 3 (POP3) or Mobile Gmail account except that the Post Office Protocol (POP) & Simple Mail Transfer Protocol (SMTP) servers are already hardcoded to point to the Application Server. Registration requires the user to provide a username/nickname/password, and can choose the frequency that the account is to synchronize automatically.

Synchronization

The act of synchronizing is similar to ActiveSync or pocket Quicken for personal data assistants (PDAs). Once the user's login information is authenticated, account data for each participating retailer is updated.

For security reasons the handset only synchronizes with the application layer, and not directly with the accounting layer. To thwart fraud or hacking, the Application Server will have separate authentication and encryption for allowing device access vs. authenticating with the Accounting Server. As the number of retailers increases, the application can sync with multiple Application Servers to update its resident account profile.

User Interface

The network aware application is menu driven allowing a user to access and edit profile settings, account settings, retailers, and participating retailers. The Interface features a unique interface for easy navigation across multiple retailers, and each retailer's multiple offers.

Customization & Personalization

Not all retailer's offers appeal to all users, nor will they match all lifestyle spending habits. Users are offered two options to personalize their Virtual Account profile: (a) choose among pre-categorized personas identified by popular mobile industry analysts including but not limited to Road Warrior, Soccer mom, Gadget Geek, and Graduates, or (b) manually delete retailers.

To alleviate the risk of users churning due to retail offer overload, using proprietary logic, accounts without usage are deleted and substituted with retailers that relate or match redemption behavior. Additionally, a user can delete retailers manually, and keep only the offers important to their lifestyle. Additionally, users may add retailers from a networked catalog of participating retailers, including choosing a line item entry for submitting a program they do not see in the catalog.

Gifting

In the event a customer would like to gift the use of their discount code, the account owner can gift a one-time use discount code to another mobile device. Transport of the gifted discount code may be short message system (SMS), Infrared (IR), Bluetooth, etc. For example, a customer chooses to bestow a Starbucks discount upon a friend to help them reach the Starbucks monthly spending limits for additional free offers. In this case, the device application will create a one-time discount code based on the original discount code, and encapsulate the new discount code in an SMS message. In actuality, this one-time discount code has no limitations regarding transport, only that the discount code be presented at a Point of Sale (POS) terminal. The transaction is accurately recorded against the account holder's transaction log, and displayed in their profile. Retailers will now have visibility into the equivalent of a customer's gifting/sharing use of their gift cards.

FIG. 1 shows an overview of Stored Account Value Rewards (SAVR) service architecture and platforms according to an embodiment of the invention.

FIG. 1 shows a POS kiosk, POS terminals, a management (MGMT) server, an authentication, authorization and accounting (AAA) server, an accounting server, a user profile, an application server, and a handset application.

1.) The Point of Sale (POS) terminals are networked to the centralized management (MGMT) server.

2.) The Management (MGMT) server is networked to a router. The router is networked to the remote authentication, authorization and accounting (AAA) server. The router is also networked to the remote accounting server.

3.) The authentication, authorization and accounting (AAA) server authenticates discount codes.

4.) The accounting server processes transactional data. The accounting server also updates user profiles, and syncs the user profile with the application server.

5.) The user profile is hosted on the application server.

6.) The application server organizes account data and synchronizes with a network aware application on the handset.

7.) The handset application caches the updated profile within the network aware application.

Figure 2:
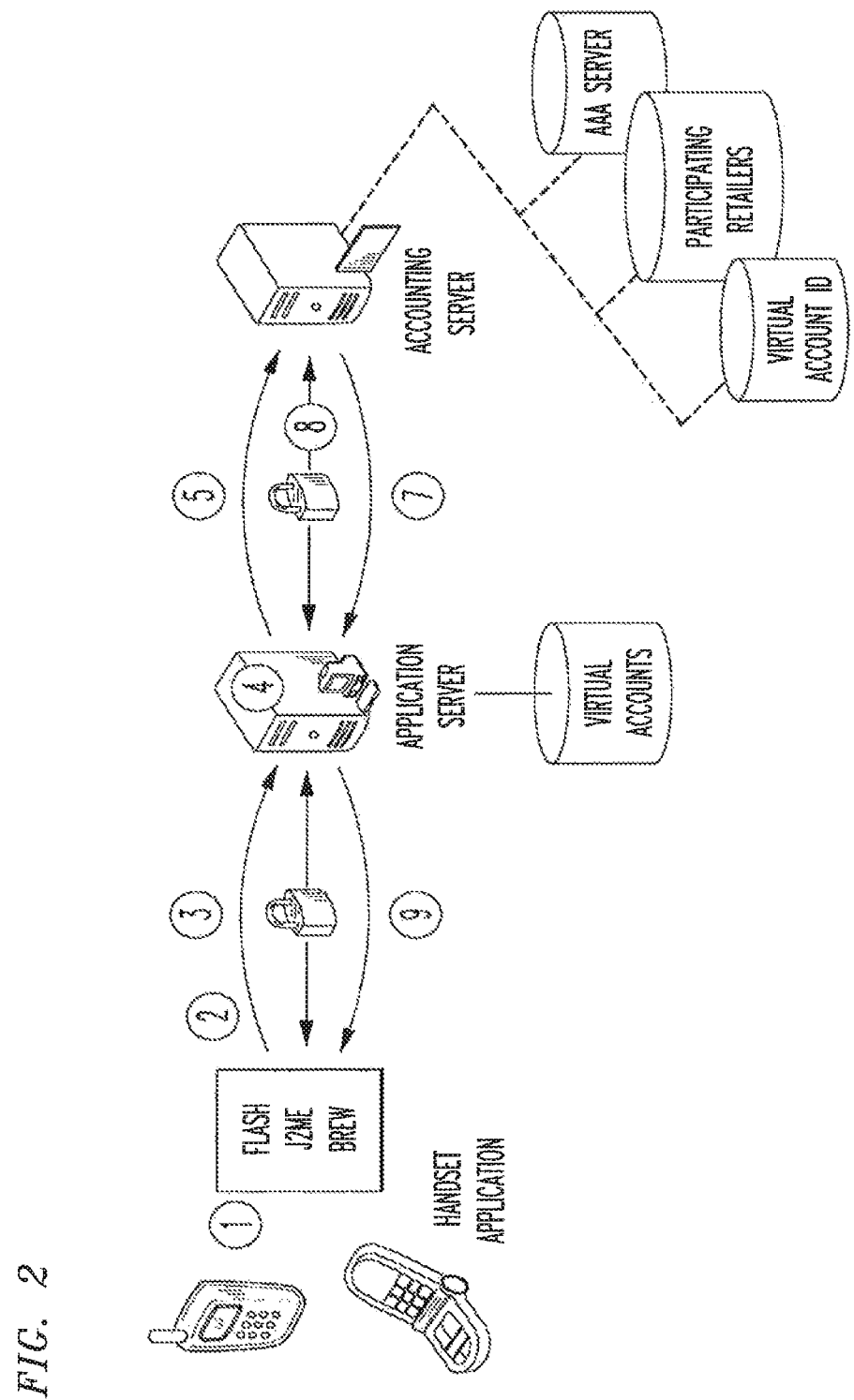
FIG. 2 is a diagram of networked components used to register a new account.

FIG. 2 is a diagram of networked components used to register a new account.

As shown in FIG. 2, when an account is being assigned for the first time, the downloaded application must establish connectivity with the Accounting Server to capture and pass device data.

The Application Server pushes data to the Accounting server to see if an account exists, and if not, prompts to create a new account and Virtual Account ID.

A link is established between the Virtual Account on the Application Server, and the Virtual Account ID on the Accounting Server. The Virtual Account ID is a transactional account used solely for financial account management functions. The Accounting Server will push data back to the Application Server so they can be viewed by the device application after transactions, and account updates.

As shown in step 1 of FIG. 2, the user downloads the handset application and registers for a new account.

In step 2, the user chooses a username and/or a password, and clicks "Submit".

In step 3, the handset application sends customer data and device data to the Application Server.

In step 4, the Application Server receives handset data, MDS/MIN, and a user's chosen log-in information.

The Application Server performs profile look up on the Accounting Server. If the return is negative, then the account is created.

In step 5, the Application Server sends all account data to the Accounting Server.

In step 6, the Accounting Server creates a new, encrypted Virtual Account ID profile.

The Virtual Account ID is created based on the Virtual Account data.

A query and pull is performed from a database of latest participating retailers.

The MDN and algorithm are used to create a set or starter Discount Codes in the account.

In step 7, the Accounting Server sends the new account ID to the Application Server.

In step 8, the Application Server syncs with the Accounting Server.

In step 9, the user views the new account and starting balance, and offers, via the device.

Figure 3:
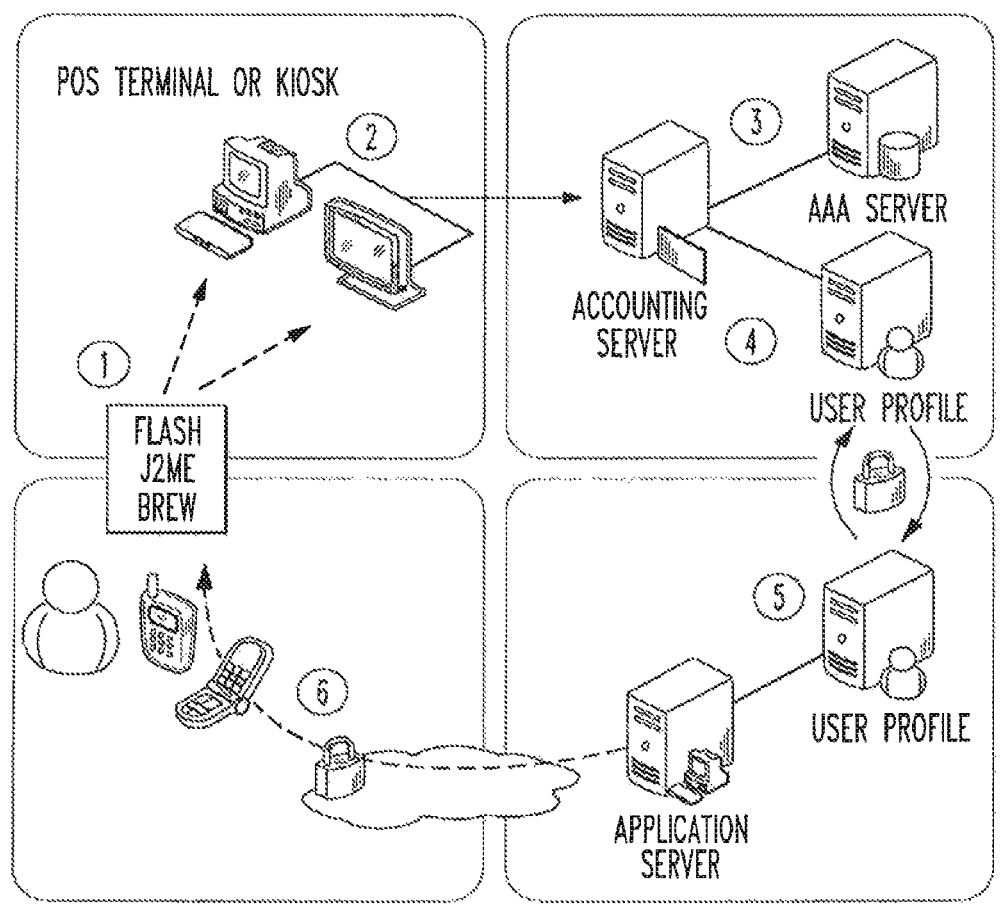
FIG. 3 is an architecture diagram showing components of the back end processing systems when transacting a discount code.

FIG. 3 is architecture diagrams showing components of the back end processing systems when transacting a discount code.

FIG. 3 shows a process of redeeming an offer at a Point of Sale (POS) terminal.

In step 1 of FIG. 3, the handset presents a discount code at the POS terminal.

In step 2, the discount code is entered into the POS terminal.

In step 3, the POS terminal authenticates the discount code at the Accounting Server and authentication, authorization and accounting (AAA) server.

The Accounting Server replies with an acknowledgement (ACK).

The POS terminal completes the transaction, and sends all data to the Accounting Server, including:
 i. The transaction type: e.g., Mobile Rewards
 ii. The Discount Code
 iii. The retailer ID
 iv. The transaction dollar amount; and
 v. A timestamp In step 4, the Accounting Server processes the transaction and updates the user profile, by:
 Reversing the Discount Code to determine the Virtual Account ID;
 Debiting value of the Discount Code;
 Applying rewards if applicable; and
 Updating reporting servers and transaction logs.

In step 5, the Accounting Server synchronizes all data to the Application Server.

In step 6, the Application Server updates the Virtual Account profile. The Application Server pushes updated data to the handset application. The user may also pull down updates using a "SYNC" button.

Figure 4:
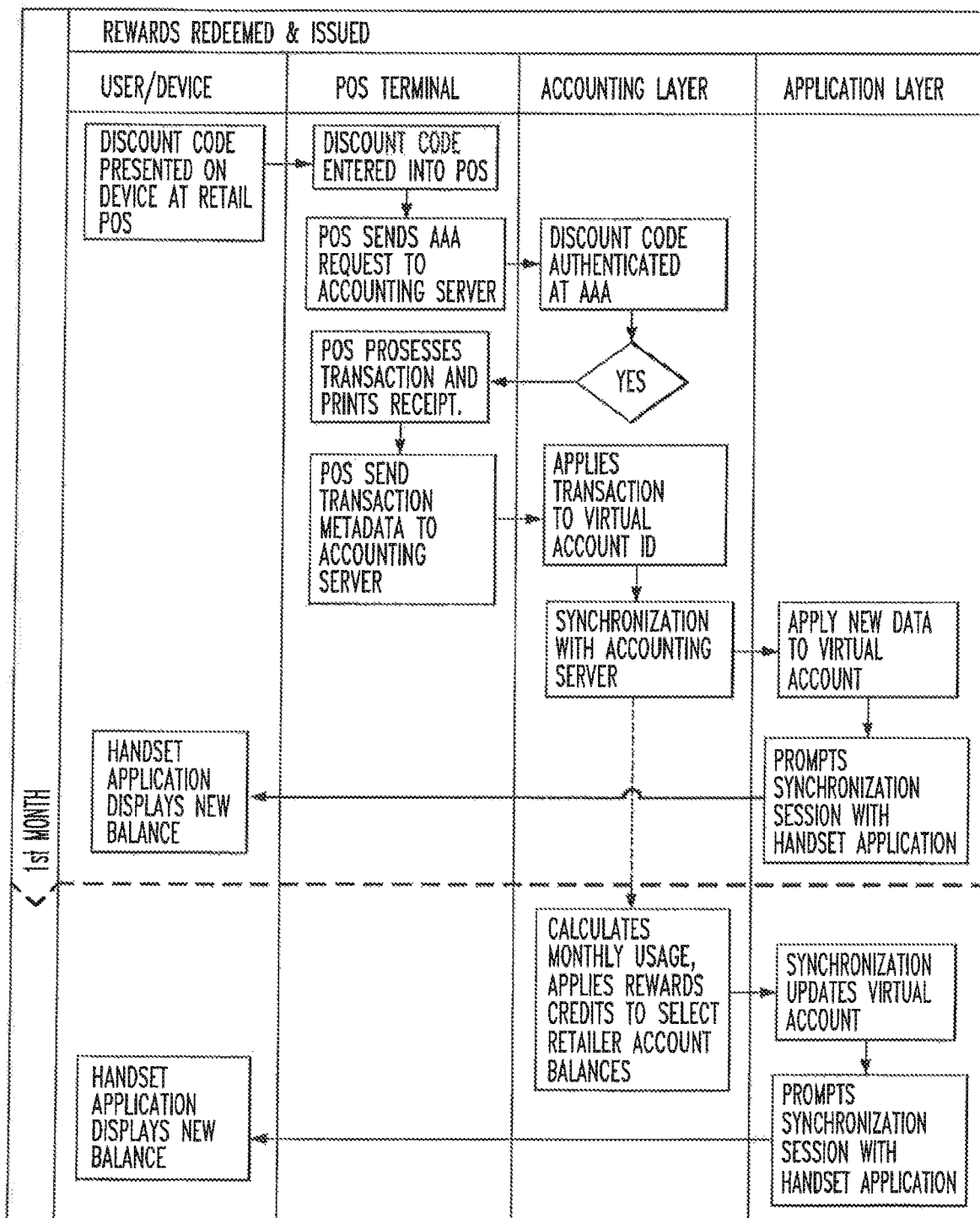
FIG. 4 is a flow diagram showing a redemption process and rewards application.

FIG. 4 is a flow diagram showing a redemption process and rewards application.

FIG. 4 shows rewards redeemed and issued.

FIG. 4 shows that a discount code is presented on the user device at a retail Point of Sale (POS) terminal.

At the POS terminal, the discount code is entered.

The POS terminal sends the authentication, authorization and accounting (AAA) request to the Accounting Server.

At the Accounting layer, the discount code is authenticated at the authentication, authorization and accounting (AAA) server. If authenticated, the accounting layer communicates with the POS terminal, which processes the transaction and prints a receipt.

The POS terminal sends transaction metadata to the Accounting Server.

The Accounting layer applies the transaction to the Virtual Account ID, and synchronizes with the Accounting Server.

The application layer applies new data to the virtual account, and prompts a synchronization session with the handset application.

The handset application displays the new balance on the user device.

After the first month, the accounting layer calculates monthly usage, applies rewards and credits to the account balances at select retailers.

The Application Layer synchronization updates the virtual account.

The Application Layer prompts a synchronization session with the handset application.

The handset application displays the new balance on the user device.

While the invention has been described with reference to the exemplary embodiments thereof, those skilled in the art will be able to make various modifications to the described embodiments of the invention without departing from the true spirit and scope of the invention.

What is claimed is:

1. A method of enabling a physical point of sale (POS) system to execute a transaction associated with a radio device to completion without the physical point of sale (POS) system ever having received a financial account number from the radio device, comprising:
 receiving at an accounting server from a physical point of sale (POS) system, a transaction-specific unique code and not a financial account number, the transaction-specific unique code without a financial account number having been received by the physical point of sale (POS) system from a given physical radio device that provided the transaction-specific unique code, for executing a transaction, without providing the financial account number;
 receiving the transaction-specific unique code without the financial account number at the accounting server for determination of a device-specific virtual account ID using device-specific identity information unique to the radio device, for routing the transaction to an authentication, authorization and accounting (AAA) server appropriate for the device-specific virtual account ID in a location remote from the radio device to authorize the physical point of sale (POS) system to execute the transaction to completion; and
 communicating an authorization message for the transaction without also communicating the financial account number to the physical POS system that received the transaction-specific unique code without the financial account number from the radio device;
 wherein the transaction-specific unique code is traceable to the device-specific virtual account ID;
 wherein each of the POS system and the radio device includes a combination of hardware and software; and
 wherein the authorization message facilitates the physical point of sale (POS) system to execute the transaction to completion without ever having received any financial account number from the radio device.

2. The method of enabling a physical point of sale (POS) system to execute a transaction associated with a radio device to completion without the physical point of sale (POS) system ever having received a financial account number from the radio device according to claim 1, further comprising:
 receiving an aggregated plurality of retail discounts associated with a virtual account specifically for use by a user of the given physical radio device.

3. The method of enabling a physical point of sale (POS) system to execute a transaction associated with a radio device to completion without the physical point of sale (POS) system ever having received a financial account number from the radio device according to claim 1, further comprising:
 receiving a one-time gift code from another given physical radio device.

4. The method of enabling a physical point of sale (POS) system to execute a transaction associated with a radio device to completion without the physical point of sale (POS) system ever having received a financial account number from the radio device according to claim 1, further comprising:
 receiving a discount to the transaction based on a loyalty reward program associated with a virtual account for a user of the radio device.

5. The method of enabling a physical point of sale (POS) system to execute a transaction associated with a radio device to completion without the physical point of sale (POS) system ever having received a financial account number from the radio device according to claim 4, further comprising:
   accessing a plurality of different loyalty programs in the virtual account for the user of the radio device.

6. The method of enabling a physical point of sale (POS) system to execute a transaction associated with a radio device to completion without the physical point of sale (POS) system ever having received a financial account number from the radio device according to claim 1, further comprising:
   generating a device-specific portion of the transaction-specific unique code issued by the accounting server, for provision to the given physical radio device at a time prior to execution of the transaction to completion.

7. A method performed by a physical point of sale (POS) system to execute a transaction associated with a radio device to completion without the physical point of sale (POS) system ever having received a financial account number from the radio device, comprising:
   receiving from the radio device a transaction-specific unique code without also receiving any financial account number from the radio device;
   routing to a remote computer system the transaction-specific unique code without also routing any financial account number to the remote computer system, the transaction-specific unique code including information enabling an accounting server to determine, from the transaction-specific unique code without any financial account number a device-specific virtual account ID sufficient to authorize the physical point of sale (POS) system to execute a transaction to completion; and
   receiving an authorization message for the transaction without also receiving any financial account number from the radio device;
   wherein the virtual account ID is based on device-specific identity information unique to the radio device;
   wherein the transaction-specific unique code is traceable to the device-specific virtual account ID;
   wherein the POS system includes a combination of hardware and software; and
   wherein the authorization message facilitates the physical point of sale (POS) system to execute the transaction to completion without the POS system ever having received from the radio device and without the POS system having ever provided to the remote computer system any financial account number.

8. The method performed by a physical point of the (POS) system to execute a transaction associated with a radio device to completion without the physical point of sale (POS) system ever having received a financial account number from the radio device according to claim 7, further comprising:
   receiving an aggregated plurality of retail discounts associated with the virtual account ID.

9. The method performed by a physical point of sale (POS) system to execute a transaction associated with a radio device to completion without the physical point of sale (POS) system ever having received a financial account number from the radio device according to claim 7, further comprising:
   applying a loyalty reward program to a virtual account associated with the virtual account ID.

10. The method performed by a physical point of sale (POS) system to execute a transaction associated with a radio device to completion without the physical point of sale (POS) system ever having received a financial account number from the radio device according to claim 7, further comprising:
   providing a device-specific portion of the transaction-specific unique code issued by the accounting server, to the given physical radio device.

* * * * *